ated Mar. 6, 1962

3,024,220
PREPARATION OF POLYETHYLENE TEREPHTHALATE
Francis Bernard Cramer, Newark, Del., assignor to E. I. du Pont de Nemours and Company, Wilmington, Del., a corporation of Delaware
No Drawing. Filed June 13, 1957, Ser. No. 665,598
1 Claim. (Cl. 260—75)

This invention relates to a chemical process. More specifically it is concerned with a novel and useful process for the production of a fiber-forming polyethylene terephthalate.

By the term "fiber-forming polyethylene terephthalate" is meant a linear high polymer having an inherent viscosity greater than 0.3 and composed of at least ninety mole percent of ethylene terephthalate units of the formula

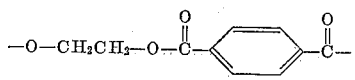

with a crystalline melting point above 235° C.

Fiber-forming polyethylene terephthalate is ordinarily prepared commercially by an ester exchange reaction between dimethyl terephthalate and ethylene glycol. The reaction is carried out in two steps, known as "ester exchange" and "polymerization." In the first step (ester exchange), dimethyl terephthalate is reacted with a large excess of ethylene glycol near the normal boiling point of the ethylene glycol, 197° C., and at atmospheric pressure. After this reaction has proceeded until the methyl ester groups have been replaced by hydroxyethyl ester groups with removal of methanol, the excess ethylene glycol is removed by distillation. In the second step (polymerization), the temperature is raised to about 280° C., the pressure is reduced to a low value, and ethylene glycol is removed until polymer of the desired molecular weight is obtained. The entire process even with ester interchange and polymerization catalysts ordinarily takes about two to five hours for ester exchange and an equal time for polymerization using preferred catalyst systems.

An alternative route to the polyester is mentioned in U.S. 2,465,319 (Whinfield and Dickson). This patent describes the direct preparation of polyesters from ethylene glycol and terephthalic acid. This (direct esterification) method is obviously very attractive in that it avoids use of the costly dimethyl terephthalate. However, it has not achieved commercial importance because it proceeds extremely slowly and with the formation of large amounts of diethylene glycol and similar ethers, which, unless removed by a separate purification step after the initial condensation, become a part of the polymer chain, thereby introducing aliphatic ether linkages into the final polymer causing shaped structures produced therefrom to exhibit poor ultraviolet light stability, poor hydrolytic stability, poor hot-wet ("wash-and-wear") properties, and accelerated dye fading. If these units exceed ten mole percent of the polymer, the polymer is generally not suitable for fiber and film production.

It is an object of the present invention to provide a rapid process for the preparation of a fiber-forming polyethylene terephthalate directly from terephthalic acid and ethylene glycol.

Another object is to provide a rapid process for the preparation of a fiber-forming polyethylene terephthalate low in ether content by reaction of terephthalic acid and ethylene glycol.

These and other objects will become apparent in the course of the following specification and claims.

In accordance with the present invention, a fiber-forming polyethylene terephthalate is prepared by forming a condensate from ethylene glycol and terephthalic acid in a molar ratio of between about 1:1 and 15:1 (glycol:acid) at a temperature between about 220° C. and 285° C. under super-atmospheric pressure and, after removal of excess glycol and the water formed, polymerizing the said condensate.

The condensate is formed from terephthalic acid free of strong acid (i.e., an acid having a pKa in water below about 3.0) and under an oxygen free atmosphere. Crude terephthalic acid may be purified by dissolving it in alkali, treating with finely divided carbon, and regenerating with acid. Recrystallization of the diammonium salt of the crude acid followed by regeneration with acid is an alternative procedure as is the high temperature precipitation from water described in British Patent 750,806. If purification is effected from nitrogen-containing solvents such as N-methyl pyrrolidone, care should be taken to remove all of the solvent, since even traces of nitrogen-containing compounds lead to polymer having poor color.

As illustrated in the examples, the presence of ethers in the polymeric product is inhibited by forming the condensate in the presence of metals and metallic salts capable of reacting with terephthalic acid under conditions of the reaction to produce the metal terephthalate.

The following examples are cited to illustrate the invention; they are not intended to limit it in any manner.

The inherent viscosity, $\eta\text{inh}$, is determined at 30.0° C. at a concentration of 0.5 gram per 100 ml. in a 60/40 mixture of phenol/sym.-tetrachloroethane, $\eta\text{inh}$ is calculated from the relation $$\eta\text{inh} = \frac{\ln \eta\text{rel}}{c}$$

where $\eta\text{rel}$ is the ratio of flow time for solution to that for pure solvent in a capillary viscometer, and $c$ is the concentration (0.5).

The ether content is expressed as mole percent of diethylene glycol terephthalate segments. It is determined in the examples from the crystalline melting points. It is known that pure polyethylene terephthalate has a crystalline melting point of very close to 265.5° C. and that this is depressed about 3° C. for each mole percent of copolymer ingredient to at least twenty mole percent copolymer. Thus a depressed melting point corresponds to a certain copolymer composition. For example, a melting point of 253.5° C. for a polymer made only from ethylene glycol and terephthalic acid would have four mole percent diethylene glycol units; for a polymer made from ethylene glycol, terephthalic acid, and sebacic acid with 98% terephthalic acid and two percent sebacic acid, the same melting point indicates two mole percent diethylene glycol units.

The crystalline melting point is obtained by noting the temperature for the disappearance of the bright image when an annealed polymer sample is observed between crossed polarizing prisms and slowly heated. Annealing is carried out by heating the polymer sample under nitrogen at 180° C. for 30 minutes.

In each of the examples cited below, except as noted, the low pressure polymerization step is performed by subjecting the high pressure step condensate (from which water and excess glycol have been removed by distillation) to a temperature of 283° C. for a period of 2 hours under a pressure of about 0.1 mm. Nitrogen is passed through the molten mass during the polymerization. In each polymerization the high pressure step condensate is mixed with 0.18 part of antimony oxide for every 300 parts terephthalic acid used in its preparation. The catalyst is added after the high pressure step except in Example 4, where, as noted, the equivalent amount of catalyst is added along with the reactants in the high pressure step. The high pressure step condensate is formed in each of the examples in a sealed tube under nitrogen, except as noted, in Examples 12, 13 and 15.

Examples 1 to 7 are cited to illustrate the process of the present invention both with various ether inhibitors and in the absence of such additives. In each of these examples the high pressure step condensate is prepared by reacting 224 parts (3.6 moles) of ethylene glycol with 300 parts (1.81 moles) of terephthalic acid, the molar ratio of glycol to acid being 2:1 (glycol:acid) at 245° C. for a period of 1 hour. Autogenous pressure in the system is about 50 p.s.i. The identity of ether inhibitor where used, amount of inhibitor, and characteristics of the final polymer are reported in Table I.

TABLE I

| Ex. | Ether inhibitor | Parts | Mol per-cent [1] | Ether (per-cent) | [2] I.V. | M.P.[3] (° C.) |
|---|---|---|---|---|---|---|
| 1 | None | | | 4.2 | .64 | 253 |
| 2 | Sodium acetate tri-hydrate. | 0.15 | 0.03 | 3.5 | .53 | 255 |
| 3 | ___do___ | 0.3 | 0.61 | 2.8 | .73 | 257 |
| 4[4] | ___do___ | 0.3 | 0.61 | 3.5 | .94 | 255 |
| 5 | ___do___ | 1.5 | 0.30 | 2.2 | .62 | 259 |
| 6 | Calcium acetate monohydrate. | 0.3 | 0.47 | 2.8 | .69 | 257 |
| 7 | Manganous acetate tetrahydrate. | 0.3 | 0.03 | 2.5 | .82 | 258 |

[1] Based on ethylene glycol.
[2] Inherent viscosity.
[3] Melting point.
[4] Antimony oxide catalyst added among reactants in high pressure step.

In forming the high pressure condensate the temperature employed may vary from about 220° C. to about 285° C. Generally the reaction is complete in about ¼ hour at the higher temperature. A longer reaction period is employed at the lower temperatures. This relationship is exemplified in Examples 8 to 11, inclusive. In Examples 8 and 9, wherein no ether inhibitor is employed, the molar ratio of ethylene glycol to terephthalic acid is 3:1 (glycol:acid). In Examples 10 and 11, wherein 0.3 part (0.013 mol percent) calcium acetate monohydrate is employed as ether inhibitor, the molar ratio of reactants is 7:1 (glycol:acid).

TABLE II

| Ex. | Glycol [1] | Acid [1] | Period (hrs.) | Temp. (° C.) | Ether (per-cent) | I.V. | M.P. (° C.) |
|---|---|---|---|---|---|---|---|
| 8 | 336 | 181 | 2 | 222 | 4.5 | .38 | 252 |
| 9 | 336 | 181 | ¼ | 283 | 6.5 | .70 | 246 |
| 10 | 785 | 300 | 3 | 222 | 3.5 | .51 | 255 |
| 11 | 785 | 300 | 1 | 245 | 3.8 | .64 | 254 |

[1] In parts by weight.

The molar ratio of reactants used in forming the high pressure step condensate may vary from about 1:1 to about 15:1 (glycol:acid). For any given temperature, a longer reaction period is usually advisable when operating with the lower proportions of glycol. In Examples 12 to 14 below, a temperature of 245° C. is employed in forming the high pressure step condensate while a temperature of 222° C. is employed in Example 15. Examples 12 and 13 use 0.086 and 0.063 mol percent, respectively of calcium acetate monohydrate as ether inhibitor. Example 14 employs 0.052 mol percent of the same inhibitor while none is present in the reaction of Example 15.

TABLE III

| Ex. | Molar ratio | Period (hrs.) | Ether (percent) | I.V. | M.P. (° C.) |
|---|---|---|---|---|---|
| 12 [1] | 1:1 | 2 | 2.2 | 0.40 | 259 |
| 13 [1] | 1.5:1 | 1¼ | 1.8 | 0.41 | 260 |
| 14 | 1.8:1 | 1 | 1.2 | 0.52 | 262 |
| 15 [1] | 14.8:1 | 2½ | 5.5 | 0.49 | 249 |

[1] High pressure condensate formed in a pressure vessel with glycol vapors forming inert atmosphere and water and excess glycol permitted to escape intermittently

*Example 16*

The procedure of Example 6 (using 0.049 mol percent ether inhibitor) is modified by use of reactants as follows:

| | Parts |
|---|---|
| Ethylene glycol | 213 |
| Terephthalic acid | 300 |
| Sodium-2,5-di(carbomethoxy)benzenesulfonate | 10 |

The polymeric product, which contains 2% polyethylene-5-sulfoisophthalate is observed to have the following properties:

Ether content _____ percent __ 4.2
Inherent viscosity _____ 0.51
Melting point _____ ° C __ 2.47

A film pressed from the polymer is immersed for 2 hours in a 125° C. aqueous solution of 3% (based on the weight of the film) of Sevron Red 4G dye (AATCC, v. 32), a basic dye of the quaternary ammonium type. The film is dyed a deep shade of red. A comparative control prepared as taught in Example 6 absorbs virtually none of the dye. Similar results are obtained using Genacryl Red 6B (Am. Dyestuff Rep., 43, 432).

*Example 17*

The procedure of Example 1 is modified by use of reactants as follows:

| | Parts |
|---|---|
| Ethylene glycol | 550 |
| Terephthalic acid | 300 |

The high pressure condensate formation is complete in 1 hour. The polymeric product is observed to have properties as follows:

Ether content _____ Percent __ 5.8
Inherent viscosity _____ 0.56
Melting point _____ ° C __ 248

A yarn is formed from the polymer by extruding the melt at 270° C. through a spinneret (orifice diameter 0.009 inch) and drawing the shaped structure four times its extruded length. The yarn has a tenacity of 3.0 grams per denier and an elongation of 36%.

When an attempt is made to form the high pressure condensate from the reactants of this Example as related above at reflux temperatures, 18 hours is required to complete formation of the high pressure condensate. Furthermore, the polymeric product produced from this condensate has an ether content of 6.5%. Its inherent viscosity is 0.60 and melting point is 246° C. When the procedure is repeated using 0.3 mol percent sodium acetate trihydrate as ether inhibitor in the formation of the condensate, no reduction in period of condensation formation is noted (18 hrs.); however, the ether content of the polymeric product is reduced to 2.2%.

*Example 18*

A strongly colored product results when an attempt is made to produce the product in the presence of cold-rolled common steel. This is illustrated following the technique of Example 1 and employing 372 parts of ethylene glycol and 500 parts of terephthalic acid, a glycol:acid ratio of 2:1, in the presence of slugs of cold-rolled common steel. The highly colored product has an ether content of 4.5%, an inherent viscosity of 0.89, and a melting point of 252° C. Repetition of the example with the inclusion of 0.031 mole of sodium acetate trihydrate fails to improve the color but reduces the ether content to 2.8% (I.V. 0.69; M.P. 257° C.). Substitution of molybdenum-stabilized stainless steel for the cold-rolled common steel produces a product of excellent color both with (M.P. 257° C.) and without (M.P. 250° C.) ether inhibitor.

As previously defined, the molar proportions of glycol to acid may range from 1:1 to 15:1 in accordance with the teachings of the present invention. To avoid removal of large excesses of glycol from the high pressure step condensate, it is usually more economical to operate within the molar ratio of 1:1 to 7:1 (glycol:acid). It is preferred to maintain this molar ratio of from about 1.5:1 to 3:1 (glycol:acid) since unreacted acid tends to sublime during the polymerization when lower ratios are used.

A temperature as high as 285° C. can be used in the high pressure condensation step. As illustrated in the examples, the reaction is operable at 220° C., provided the reaction period is extended. It is preferred to operate at a temperature of about 245° C. Autogenous pressures are suitable. In the range of the preferred temperature recited this pressure is about 50 pounds per square inch. Higher pressures are suitable. In general, the pressure is kept as low as possible consistent with the desired temperature.

As recited previously, the high pressure condensate is formed under an inert atmosphere. Nitrogen or other inert gas is suitable for this purpose. Glycol vapors are usually most convenient for this purpose.

As illustrated in the examples, metals and metal compounds capable of reacting with terephthalic acid under the conditions of formation of the high pressure condensate are suitable to inhibit the formation of ethers. These materials are effective when employed in amounts of from about 0.01 to 0.30 mole percent based on ethylene glycol. The use of 0.05 mole percent of inhibitor is preferred. Among suitable materials for this purpose are sodium, sodium methoxide, sodium acetate, sodium terephthalate, manganous acetate, and calcium acetate. It is preferred to use the sodium compounds since sodium terephthalate has better solubility in the molten polymer. Generally the use of an ether inhibitor produces a final polymer containing less than 4% ether. Under preferred conditions it is less than 3%. Fibers produced from such polymer are of a very high quality. The terephthalic acid employed in forming the high pressure step condensate is free of strong acid, as previously noted. Thus, if in the preparation or purification of the terephthalic acid used, it is contacted with a strong acid, care must be taken that all excess acid is removed. For this reason, it is preferable to use a volatile acid rather than sulfuric acid in such a step. With no strong acid present acceptable polymer, that is, with an ether content of less than 10 percent, may be obtained. The use of such acid permits polymer of as low or lower ether content than that formed from the same materials in the slow, low temperature, atmospheric pressure process of the prior art and also that formed by ester interchange.

In a continuous process, by-product water and some glycol are removed as the reaction proceeds. This allows the reaction to proceed to completion more rapidly. The removal of water may be continuous or intermittent. In a batch process, water may be removed or not, during the pressure cycle. If not, it is removed with excess glycol before the polymerization cycle. It is surprising that the presence of water may be tolerated during the pressure cycle since it is generally believed essential to force the reaction by its removal.

In the conventional process using ester exchange, it is essential if high molecular weights are to be obtained that practically all methyl ester groups be replaced by hydroxyethyl ester groups during the exchange step. With the large amounts of ethylene glycol used the material to be polymerized is generally mainly bis(hydroxyethyl) terephthalate. In the process of this invention, the material to be polymerized may be mainly bis(hydroxyethyl)) terephthalate when high mole ratios of ethylene glycol to acid are used in the pressure step or it may consist of this material plus higher condensates of glycol and acid and even some free terephthalic acid when low mole ratios are used. It is not essential that only hydroxyethyl ester-ended materials be present for the polymerization; free acid ends are condensed during polymerization.

The condensate formed in the high pressure step is polymerized directly, without purification, by methods well known to the art. While the reactions involved are not exactly the same as occur during polymerization after ester exchange, they are sufficiently similar so that disclosed procedures are well suited for this step. A conventional polymerization catalyst such as antimony trioxide is ordinarily used. While the catalyst may be added among the reactants employed in forming the high pressure step condensate, it is preferable that it be added at the end of the high pressure step.

In the conventional batch polymerization process, the pressure in the autoclave is reduced and ethylene glycol is removed until polymer of the desired molecular weight is obtained. The temperature may be raised during polymerization to increase the polymerization rate and to maintain a molten system. Temperatures in the range 220° C. to 300° C. are suitable with pressures being below 10 mm. It is preferred to operate at about 280° C. and less than 5 mm. pressure. The polymerization is complete in about two hours or less, and the product is very nearly pure white in color when pure intermediates are used. The presence of color in the final product would indicate that the equipment used is not clean, or that some impurity, such as a nitrogenous material, is present in the starting materials. The short time required by the process of this invention allows preparation with a minimum of side reactions and hence greatly improved color in the final product over the conventional product.

In the continuous process the polymerization is carried out as described in the prior art, for example, in U.S. 2,727,882 (Vodonik). The time required to prepare polyethylene terephthalate using the process of the present invention is substantially less than that required for its preparation by the ester exchange method. The high pressure condensation generally requires between 15 and 60 minutes, while the low pressure polymerization is complete in about two hours. By contrast the first step in the ester exchange process alone requires about three hours even in the presence of a catalyst.

The process of the invention may be used for polyethylene terephthalates having at least ninety mole percent of ethylene terephthalate units. For certain purposes, e.g. dyeability, it may be desirable to have units other than ethylene terephthalate deliberately present. Examples of modifying ingredients that may be used are sodium dicarboxybenzenesulfonate, isophthalic acid, bibenzoic acid, sebacic acid, and other aromatic and aliphatic dicarboxylic acids; tetramethylene glycol, pentaglycol, polyethylene oxide glycol, and other aliphatic glycols; and hydroxy acids such as hydroxyethylbenzoic acid. While aliphatic ethers such as diethylene glycol and polyethylene oxide glycol are to be avoided for general fiber and film uses, aromatic-aromatic and aromatic-aliphatic ethers are generally not harmful and such units as bis(carboxyphenyl)ether and 1,4-bis(carboxyphenoxy)butane may be employed to alter the polymer properties. Monofunctional reactants such as β-naphthoic acid may be present in minor amounts if desired to limit the molecular weight.

Since the production of high quality yarn precludes the use of more than about 10% of such modifying units, and since diethylene glycol terephthalate units are in the nature of such modifiers, it is paticularly desirable to keep the ether content of the final polymer as low as possible when using polymer modifiers to increase dyeability and the like.

While the process is particularly useful in that the short time results in easy operability as a continuous process, it is not necessary to so operate. The process may be interrupted at any stage and then continued later. Thus, the pressure condensate may be stored or blended with other similar material or transported to a different location before it is polymerized. Reference to the preceding discussion and examples shows that the process is extraordinarily flexible. While operating conditions dictate a high pressure cycle and a low pressure cycle, the condensation and polymerization processes merge one into the other, and it is not required that one stage be complete before the next begins as is true in a process involving ester exchange.

During the high pressure step of the process moderate amounts of inert additives may be present if desired. These include organic chemicals such as aliphatic and aromatic hydrocarbons and finely-divided solid materials such as silica or titanium dioxide. Such materials may also be added just before or during the low pressure step.

Polymer prepared in accordance with the present process may be formed by the conventional methods of spinning and casting into shaped articles such as films, tapes, fibers, bristles, and the like. These can be used in the preparation of yarns, woven and non-woven fabrics, papers, leathers, and other structures by methods well known to the art.

Many other modifications will be apparent to those skilled in the art from a reading of the above without a departure from the inventive concept.

What is claimed is:

A process for the formation of a fiber-forming polyethylene terephthalate which comprises polymerizing, at a temperature between about 220° C. and 300° C. and under a pressure below about 10 mm. of mercury, the ester condensate formed by heating for at least about 15 minutes a mixture of ethylene glycol and terephthalic acid in a molar ratio of glycol to acid of from about 1:1 to 15:1 at a temperature between about 220° C. and 285° C. under pressure which is at least autogenous and in the presence of from about 0.01 to about 0.30 mol percentage based on terephthalic acid of calcium acetate the system being free of acid having a pKa in water below about 3.0, water formed in the said condensation and excess glycol being removed prior to the said polymerization.

References Cited in the file of this patent

UNITED STATES PATENTS

| | | |
|---|---|---|
| 2,465,319 | Whinfield et al. | Mar. 22, 1949 |
| 2,578,660 | Auspos et al. | Dec. 18, 1951 |
| 2,647,885 | Billica | Aug. 4, 1953 |

FOREIGN PATENTS

| | | |
|---|---|---|
| 545,351 | Belgium | Feb. 15, 1956 |
| 549,096 | Belgium | Dec. 28, 1956 |
| 552,699 | Belgium | Dec. 15, 1956 |
| 545,091 | Belgium | Aug. 9, 1956 |